United States Patent
Hamid et al.

(10) Patent No.: US 9,430,250 B2
(45) Date of Patent: Aug. 30, 2016

(54) BOOTABILITY WITH MULTIPLE LOGICAL UNIT NUMBERS

(71) Applicant: Kingston Digital, Inc., Fountain Valley, CA (US)

(72) Inventors: Laurence Hamid, Ontario (CA); Dean Charles Michaud, Ontario (CA)

(73) Assignee: Kingston Digital, Inc., Fountain Valley, CA (US)

( * ) Notice: Subject to any disclaimer, the term of this patent is extended or adjusted under 35 U.S.C. 154(b) by 239 days.

(21) Appl. No.: 13/692,553

(22) Filed: Dec. 3, 2012

(65) Prior Publication Data
US 2014/0156982 A1 Jun. 5, 2014

(51) Int. Cl.
*G06F 9/44* (2006.01)

(52) U.S. Cl.
CPC ............ *G06F 9/441* (2013.01); *G06F 9/4411* (2013.01)

(58) Field of Classification Search
CPC ............................... G06F 9/441; G06F 9/4411
See application file for complete search history.

(56) References Cited

U.S. PATENT DOCUMENTS

| | | | |
|---|---|---|---|
| 6,061,788 A | 5/2000 | Reynaud et al. | |
| 6,314,532 B1 | 11/2001 | Daudelin et al. | |
| 6,381,694 B1 | 4/2002 | Yen | |
| 6,430,663 B1* | 8/2002 | Ding | G06F 9/441 711/162 |
| 6,542,979 B1* | 4/2003 | Eckardt | 711/173 |
| 6,625,754 B1 | 9/2003 | Aguilar et al. | |
| 6,944,867 B2* | 9/2005 | Cheston | G06F 9/4411 713/100 |
| 7,174,457 B1 | 2/2007 | England et al. | |
| 8,060,735 B2* | 11/2011 | Madjlessi | 713/1 |
| 2008/0052507 A1* | 2/2008 | Chow et al. | 713/2 |
| 2009/0070576 A1* | 3/2009 | Hocking et al. | 713/2 |
| 2010/0235596 A1* | 9/2010 | Carpenter et al. | 711/163 |
| 2011/0055537 A1 | 3/2011 | Yang | |
| 2012/0042156 A1 | 2/2012 | Ma et al. | |
| 2012/0151219 A1 | 6/2012 | Ryu et al. | |
| 2012/0284494 A1 | 11/2012 | Funk et al. | |

FOREIGN PATENT DOCUMENTS

WO WO2011025185 A2 3/2011

OTHER PUBLICATIONS

"Windows to Go: scenario overview", Microsoft Corporation, https://web.archive.org/web/20120303165246/http://technet.microsoft.com/en-us/library/hh831833.aspx (Accessed Oct. 15, 2015, Published Feb. 29, 2012).*

(Continued)

*Primary Examiner* — Jaweed A Abbaszadeh
*Assistant Examiner* — Brian J Corcoran
(74) *Attorney, Agent, or Firm* — Dorsey & Whitney LLP (57) ABSTRACT

Bootability of a computer system with multiple LUNs. A flash device powers-on into a default LUN, from which the system boots, maintaining any other LUNs unavailable. The first LUN reconfigures the system to remove itself as the available LUN, to load a second LUN as the only available LUN, and to reboot the computer system into the newly available second LUN. The second LUN reconfigures the system to load any additional LUNs, such as removable storage on the flash drive. Upon reconfiguration, the system includes multiple LUNs. The second LUN includes an interpolated LUN driver, which exposes additional LUNs before operation of other device drivers. The interpolated LUN driver takes control during boot-up, exposing any available LUNs before the regular environment's operating system.

20 Claims, 2 Drawing Sheets

(56) References Cited

OTHER PUBLICATIONS

U.S. Appl. No. 13/692,358, filed Dec. 3, 2012, not yet published.
U.S. Appl. No. 13/692,421, field Dec. 3, 2012, not yet published.
Yee, Bennet. "Using Secure Coprocessors." School of Computer Science, Carnegie Mellon University, Pittsburgh, PA. May 1994. Thesis. 20 pages.
The extended European Search Report dated Jun. 7, 2016 in connection with European Patent Application No. 13860762.7 filed Dec. 3, 2013.

Anonymous: "Desinfec't-Wikipedia", Jul. 22, 2012, XP055276372, Retrieved from the Internet: URL: https://de.wikipedia.org/w/index.php?title=Desinfec't&oldid=105866247 [retrieved on May 30, 2016].
Machine translation, Anonymous: "Desinfec't-Wikipedia", Jul. 22, 2012, XP055276372, Retrieved from the Internet: URL: https://de.wikipedia.org/w/index.php?title=Desinfec't&oldid=105866247 [retrieved on Jun. 14, 2016].
The extended European Search Report dated Jun. 15, 2016 in connection with European Patent Application No. 13861029.0.

\* cited by examiner

BOOTABILITY WITH MULTIPLE LOGICAL UNIT NUMBERS

CROSS-REFERENCE TO RELATED APPLICATIONS

Inventions described in this application can also be used in combination or conjunction, or otherwise, with techniques described in one or more of the following documents.

U.S. patent application Ser. No. 13/692,358, filed Dec. 3, 2012, in the name of the same inventor, titled "Recovering from unexpected flash drive removal,";

U.S. patent application Ser. No. 13/692,421, filed Dec. 3, 2012, in the name of the same inventor, titled "Preboot environment with system security check,";

Each and every one of these documents is hereby incorporated by reference as if fully set forth herein. These documents are sometimes referred to herein as the "Incorporated Disclosures".

BACKGROUND

1. Field of the Disclosure

This application generally relates to maximizing bootability of a computer system using devices with multiple logical unit numbers (LUNs), multiple logical disks, and related matters.

2. Background of the Disclosure

"Flash memory" is a commonly used term for nonvolatile data storage that can be read and written multiple times. Flash memory is often used in USB flash drives, sometimes called "flash drives", which are devices including memory which can communicate with a computer system using a universal serial bus (USB) protocol. Flash drives can often maintain relatively large amounts of data, often sufficiently large that operating system software and a suite of application program software can be maintained in the flash memory. Moreover, most flash drives are sufficiently small that they can draw their power requirements from the computer system to which they are connected.

One consequence of being able to store such relatively large amounts of data is that flash drives might be used to maintain an entire operating environment, including both operating system software and application software, as well as documents or other data in use or saved by a user. An operating environment that can be carried about, often on a key ring or in a pocket, is sometimes called a "portable operating environment". For example, one such environment is the "Windows to Go"™ environment promoted by Microsoft Corporation of Redmond, Wash. A first advantage of a portable operating environment is that a user can maintain an entire set of settings for personalized use on any available computer system. A second advantage of a portable operating environment is that a user can conduct their computer processing on any available computer system, without leaving personal or otherwise sensitive data for later review by unauthorized persons.

Flash drives might be able to maintain more than one such operating environment. While this has the general advantage of flexibility, it might be subject to the drawback that the computer system might not be able to access all of the operating environments maintained on a single flash drive. For example, the "Windows to Go"™ environment described above generally requires that each device coupled to the computer system has only one logical unit number (LUN). Logical unit numbers might refer to logical disks, such as separate disk images maintained on a single physical device. This has the effect that only one logical disk maintained by a flash drive, and only one such operating environment, might be accessed by a computer system so configured.

This can pose a problem when it is desired to separate functions available on a flash drive into more than one such operating environment. For a first example, as described in the Incorporated Disclosures, it might be desirable to maintain a first operating environment as a preboot environment, which performs a first set of functions, and a second operating environment as a regular operating environment, which performs a second set of functions. In one such case, as described in the Incorporated Disclosures, the preboot environment might perform security checks and anti-malware functions, while the regular operating environment performs functions the user expects from a portable operating environment. This has the effect that the user can be assured of the security of the preboot environment, and hence of the regular operating environment.

For a second example, it might be desirable to maintain a first operating environment with a first set of operating system capabilities and application programs, and a second operating environment with a second set of operating system capabilities and application programs. The user might desire to operate within the first operating environment in a first set of use cases, or within the second operating environment in a second set of use cases. For a third example, it might be desirable to maintain a first operating environment with a first set of access capabilities or access restrictions, and a second operating environment with a second set of access capabilities or access restrictions. A first set of users might access the flash drive to operate within the first operating environment, or a second set of users might access the flash drive cases to operate within the second operating environment. In such cases, a transition between the first operating environment and the second operating environment might pose difficulties for a user, particularly a user who wishes to maintain availability of data across that transition.

It thus might occur that the computer system is substantially unable, either because of its hardware or software configuration, to access more than one separate logical disk on a single device. This might have the effect that the computer system might not support access to more than one operating environment on separate logical disks on a single flash drive.

One possibility is to provide, when initially booting, that the computer system can select one of several operating environments into which to boot. For example, the computer system might select one of several alternative operating environments, either from a flash drive, a hard disk drive, or other storage device. While this can provide the user with flexibility of selecting an operating environment, it is subject to some disadvantages. For a first example, if operation of the computer system involves booting into more than one operating environment, as described in the Incorporated Disclosures with respect to the preboot environment, the user might fail, accidentally or deliberately, to follow the procedure for that operation. For a second example, booting into more than one operating environment successively might involve a degree of sophistication not generally available to the user.

Each of these examples, as well as other possible considerations, can cause difficulty in use of a flash memory with one or more portable operating environment, particularly when reliability and security of those portable operating environments are important to the user. For example, the user should take care that the flash memory device boots into each successive operating environment in turn, as directed by the procedures followed by instructions on that flash memory device. Moreover, the user should take care that they conduct operations for booting into successive operating environments correctly, possibly drawing on additional expertise each time the computer system is started using the flash drive to provide a portable operating environment. Each of these might have a detrimental effect on the value of the computer system and on use of a flash drive with more than one operating environment.

BRIEF SUMMARY OF THE DISCLOSURE

This application provides techniques for bootability of a computer system with multiple logical unit numbers (LUNs) or multiple logical disks, even in cases in which the computer system is configured to only recognize a single logical unit number (LUN) or a single logical disk. For example, in the "Windows to Go"™ environment described above, Microsoft has a hardware certification requirement that any USB device to be used for the "Windows to Go"™ environment, that the USB device must present itself as a single-LUN device at initial boot. Accordingly, in one embodiment, the computer system is initially configured to only recognize a single logical unit number. Despite this certification requirement, the computer system can be enabled, as described herein, to boot from a flash device using multiple logical unit numbers or multiple logical disks in its regular operating environment.

In one embodiment, the flash device couples to the computer system and powers-on into a default state, from which the computer system boots from a (default) first logical unit, as indicated by a default LUN (typically having a value of "0", that is, zero). For example, as described in the Incorporated Disclosures, the flash device can power-on into a read-only preboot environment that performs security checks and (optionally) performs anti-malware operations. In such embodiments, the flash device maintains any other LUNs, which it has available other than the first LUN, hidden from and thus substantially unavailable to the computer system. This has the effect that the computer system cannot substantially select any hidden LUN, and thus cannot substantially select any LUN other than the first LUN, even if there are multiple logical disks available on the flash device. This also has the effect that the computer system sees the flash device as having a single LUN, which can be useful when the computer system is attempting to use the "Windows to Go"™ environment.

In one embodiment, instructions available from the first logical disk cause the flash drive to reconfigure itself, so that its default LUN no longer indicates the first logical disk as the available logical disk, and its default LUN instead indicates a second logical disk as substantially the only available logical disk. Instructions available on the first logical disk direct the computer system to reboot, with the effect that the computer system then boots, as indicated by the new default LUN, into the new substantially only available logical disk, the second logical disk. For example, as described in the Incorporated Disclosures, the first LUN can indicate a preboot environment, which can perform security checks and (optionally) perform anti-malware operations, while the second LUN can indicate a regular operating environment. After switching available logical disks, the computer system executes or interprets instructions substantially available from the second logical disk.

In one embodiment, instructions substantially available from the second logical disk can reconfigure the flash drive substantially to make available additional logical unit numbers, indicating additional logical disks, such as removable storage made substantially available on the flash drive other than the preboot environment or the regular operating environment. For example, the regular operating environment can include operating system and application program instructions, while additional logical disks can include reserved operating system or application storage, user storage, temporary storage, or other logical memory elements. This has the effect that, upon reconfiguration, the regular operating environment can include additional logical unit numbers, which indicate additional logical disks.

In one embodiment, instructions substantially available from the second logical disk can include an interpolated LUN driver, which can be incorporated into an operating system available as part of the regular operating environment indicated by the second LUN. For example, after the computer system has identified the flash drive as a bootable device, the flash drive can report that it has only a single LUN, as expected by the computer system in some configurations, with the effect that the computer system should begin to boot from that single available LUN. As part of booting from that single available LUN, the computer system loads the interpolated LUN driver, which is configured or otherwise designated as a device driver that is loaded relatively early in the operating environment's booting process. The interpolated LUN driver exposes one or more additional LUNs before the computer system moves onto other device drivers with relatively lower priority. After the computer system finishes loading the interpolated LUN driver, the computer system will later attempt to query the flash device with respect to how which LUNs it has available. As a result of the interpolated LUN driver having exposed additional LUNs, the flash drive can (at that time) report that it has more than one available LUN. This has the effect that the regular operating environment's file system sees those available logical unit numbers on its own initialization.

After reading this application, those skilled in the art would recognize that techniques shown in this application are applicable to fields and information other than those fields specifically described herein, and to other than flash memories. In the context of the invention, there is no particular requirement for any such limitation. For example, the invention is also applicable to other forms of data storage in which the data storage device maintains some form of security against unauthorized reading, writing, or other use.

Moreover, after reading this application, those skilled in the art would recognize that techniques shown in this application are applicable to methods and systems other than those involving portable operating environments. In the context of the invention, there is no particular requirement for any such limitation. For example, other contexts can include frequent or important access to secured data, such as data that is otherwise hardware-protected, software-protected, or protected by use of a proprietary data format.

After reading this application, which shows and describes illustrative embodiments of the disclosure, other and further embodiments of the present disclosure will become apparent to those skilled in the art. As will be realized, the various embodiments of the present disclosure are capable of modifications in various obvious aspects, all without departing from the scope and spirit of the present disclosure. The drawings and detailed description are intended to be illustrative in nature and not restrictive in any way.

DETAILED DESCRIPTION

Example System Elements

Figure 1:
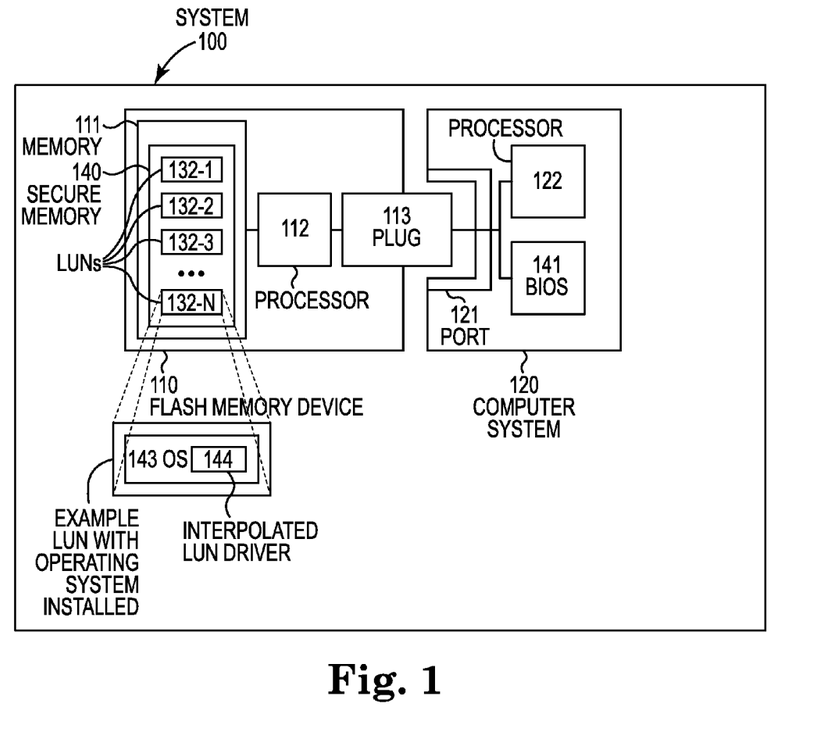
FIG. 1 shows a conceptual drawing of an apparatus including a computer system and a flash memory device.

FIG. 1 shows a conceptual drawing of an apparatus including a computer system and a flash memory device.

In one embodiment, a system 100 can include a flash memory device 110 and a computer system 120.

Flash Memory Device.

The flash memory device 110 can include one or more memories 111, one or more processors 112, and at least one flash device plug 113. For example, the flash memory device 110 can be disposed to be compatible with a universal serial bus (USB) standard, or a variant thereof, and can be packaged in a relatively small package disposed to be coupled to a USB port 121 (described with reference to the computer system 120), or a variant thereof.

While this application primarily describes a system in which the flash memory device 110 is coupled to the computer system 120 using a USB standard or a variant thereof, in the context of the invention, there is no particular requirement for any such limitation. For a first example, the flash memory device 110 can be coupled to the computer system 120 using another way to couple devices to computer systems, such as a Thunderbolt™ drive available from Apple, Inc. of Cupertino, Calif. For a second example, the flash memory device 110 can couple to the computer system 120 using a network connection, a wireless connection, or another type of connection available for communication between computing devices.

In one embodiment, the one or more memories 111 include a secure portion 114, which can be protected against undesirable writing by user programs at the computer system 120. For example, the secure portion 114 can include a portion to which the processor 112 prevents write operations, unless those write operations originate from the processor 112 itself, or from trusted instructions being interpreted by the computer system 120.

In one embodiment, the secure portion 114 can include a control section 115, including instructions and data that can be read and interpreted by the processor 112. The control section 115 can also include working locations for intermediate data used by the processor 112. For example, the control section 115 can instruct the processor 112 to perform operations as described herein.

In alternative embodiments, the control section 115 can generally instruct the processor 112 to perform any operations responsive to the computer system 120. For example, those instructions can cause the processor 112 to emulate a device other than the flash memory device 110. These other such devices might include (A) a different flash memory device 110, (B) a removable memory device of another type, such as a DVD drive, (C) a non-removable storage device such as a hard disk drive, or even (D) a completely different type of device, such as a security dongle or a wi-fi card. Of course, attempting to emulate a device other than the flash memory device 110 does not necessarily give the flash memory device 110 any capabilities other than the ones its processor 112 and memories 111 can provide.

In one embodiment, the secure portion 114 can include at least a set of logical unit numbers (LUNs) 131-1 through 131-N, each indicating (such as pointing to) a portion of the memories 111. The portion of the memories 111 referenced by a LUN is sometimes referred to herein as a "logical unit", "logical disk", or "logical drive".

For example, the LUNs 131-1 through 131-N can be maintained in a list and state table of LUNs, in which each LUN can be assigned a number, a state (such as "hidden" or "available"), and possibly other information. For example, the LUNs can indicate a first LUN 131-1 (typically having a value "0", that is, zero), a second LUN 131-2, and similarly other LUNs.

For a first example, the secure portion 114 can include a first logical unit including a preboot environment and having a first LUN 131-1 pointing to it, and a second logical unit including a regular operating environment and having a second LUN 131-2 pointing to it, such as those environments are described with respect to the Incorporated Disclosures. In such examples, a state table of LUNs (not shown) can include information with respect to the first LUN 131-1 and the second LUN 131-2. The state table of LUNs can be maintained to originally indicate that the first LUN 131-1 (pointing to the preboot environment) is the default LUN, while the second LUN 131-2 is maintained hidden. When the preboot environment has completed its operations, the state table of LUNs can be altered to indicate that the second LUN 131-2 (pointing to the regular operating environment) is the default LUN, while the first LUN 131-1 is maintained hidden. This has the effect that when the computer system boots from the default LUN (initially the first LUN 131-1), it boots from the preboot environment, and when the preboot environment has completed its operations and the computer system reboots from the default LUN (now the second LUN 131-2,) the computer system boots from the regular operating environment.

For a second example, the secure portion 114 can include additional logical units that can be used for include reserved operating system or application storage, user storage, temporary storage, or other logical memory elements, as described above. In such examples, one or more additional LUNs, and one or more associated additional logical units, can be maintained (such as in a hidden state) and exposed to the computer system (at an appropriate time, as described herein).

In one embodiment, each logical unit, as referenced by a LUN, can include an operating environment 143, such as a preboot environment or a regular operating environment, as described above, or another type of operating environment. For a first example, the preboot environment can include a "Windows PE"™ environment, modified to perform the functions as described herein, and as also described in the Incorporated Disclosures. For a second example, the regular operating environment can include a "Windows XP"™ environment, modified to perform the functions as described herein, and as also described in the Incorporated Disclosures.

Interpolated LUN Driver.

In one embodiment, the operating environment 143 (such as the regular operating environment pointed to by the second LUN described above) can include an interpolated LUN driver 144. When the computer system 120 reboots, it finds that the flash memory device 110 has only one LUN, indicating the second operating environment 143. When the computer system 120 boots from that second operating environment 143, it begins to load the operating system associated with that second operating environment 143, which includes the interpolated LUN driver 144.

In one embodiment, the interpolated LUN driver 144 is configured or otherwise designated as a device driver that is loaded relatively early in the operating environment's booting process. Because the interpolated LUN driver 144 is loaded relatively early during boot-up of the operating system, it is able to perform its operations before other device drivers that are loaded as part of booting the operating system. As described herein, the interpolated LUN driver 144 exposes one or more additional LUNs associated with the flash memory device 110, before other device drivers are loaded by the computer system 120. For example, the flash memory device 110 can include a list and state table of LUNs, including information indicating whether those LUNs are "hidden" or "available". In such cases, the interpolated LUN driver 144 would modify that list and state table of LUNs to indicate that one or more additional LUNs are no longer "hidden".

In one embodiment, the interpolated LUN driver 144 has exposed the one or more additional LUNs associated with the flash memory device 110, before other device drivers that are loaded as part of booting the operating system. As part of normal loading those later device drivers (as part of booting the operating system), the computer system 120 eventually re-queries the flash memory device 110 with respect to how many LUNs it has available, and which LUNs those are. At that time, because the interpolated LUN driver 144 has exposed additional LUNs, the flash memory device 110 responds that it has more than one available LUN.

This has the effect that the computer system 120 sees the flash memory device 110 as having more than one LUN, even though the computer system 120 was only able to initially boot from the flash memory device 110 if the flash memory device 110 had only a single LUN.

Preboot Environment.

As described herein, in one embodiment, when the flash memory device 110 is coupled to the computer system 120, the control section 115 initially indicates that the default LUN points to the preboot environment. The processor 112 at the flash memory device 110 reports only a single LUN to the computer system 120. The processor 112 at the computer system 120 boots to that single LUN, thus interpreting instructions from the preboot environment. During operation of the preboot environment, the processor 112 at the flash memory device 110 alters the default LUN to point to the regular operating environment, after which the preboot environment directs the processor 122 at the computer system 120 to reboot.

Regular Operating Environment.

As described herein, in one embodiment, when the computer system 120 reboots, the flash memory device 110 reports the new default LUN, that is, reports that the default LUN points to the regular operating environment. This has the effect that the computer system 120 boots to the regular operating environment, which includes the interpolated LUN driver 144. When the computer system 120 boots to the regular operating environment, the interpolated LUN driver 144 is configured or otherwise designated to load before the computer system 120 is able to query the flash memory device 110 with respect to its available LUNs. The interpolated LUN driver 144 is thus able to expose one or more additional LUNs before relatively lower priority drivers are loaded, after which the operating system continues to boot-up until it loads those other (relatively lower priority) drivers. When those other (relatively lower priority) drivers are loaded, the computer system 120 can "discover" that the flash memory device 110 has more than one available LUN. This has the effect that the computer system 120 can use the flash memory device 110 with more than one LUN, even though the "Windows to Go"™ environment only supports devices with only a single LUN.

In one embodiment, the flash memory device 110 can include a read-only portion, which is protected against being written to by the processing elements 112, and a read-write portion, which can be either read from or written to by the processing elements 112. For a first example, the flash memory device 110 can include processing elements 112 that maintain a logical separation between those portions of the memories 111 for which write operations are allowed, and those portions of the memories 111 for which write operations are not allowed. For a second example, the flash memory device 110 can include software directing the processing elements 112 to require authentication before performing write operations to the read-only portion, while allowing write operations to the read-write portion without such authentication.

For a third example, the flash memory device 110 can include a sub-portion of the read-write portion which is maintained as a secure read-write sub-portion, and for which read operations are only allowed with such authentication. In one embodiment, the secure read-write sub-portion can be maintained as working storage for operating system software and selected application programs, but which ordinary user application programs are not allowed to access. In one embodiment, ordinary user application programs would not be allowed to review what data or files are maintained in the secure read-write sub-portion.

Computer System.

The computer system 120 can include a USB port 121, a processor 122, and memory or storage. For example, the USB port 121 can couple to the processor 122, which can be coupled to the memory or storage.

Memory or Storage.

In one embodiment, the memory or storage can include a secure portion 140, which can maintain a computer system BIOS 141 and operating system software 142. The computer system 120 can protect a secure portion 140 of the memory or storage, such as the operating system software 142, against being readily available to application programs or to users of the computer system 120.

In one embodiment, the memory or storage can include a substantially read-only portion, which is substantially protected against being written to by the processor 122, and a read-write portion, which can be either read from or written to by the processor 122. For a first example, the memory or storage can include read-only memory (ROM), for which the hardware only allows read operations, and can include random access memory (RAM) and mass storage, for which the hardware allows both read and write operations. For a second example, the processor 122 can operate under control of operating system software 142, which can allow read operations or write operations, in response to access control parameters, to particular portions of the memory or storage, even if the hardware would otherwise allow both read and write operations to those portions of memory or storage.

In one embodiment, the system BIOS 141 can be maintained in a substantially read-only portion of the memory or storage. For example, the system BIOS 141 can be maintained in an area of memory that is only allowed to be written by special programs, such as when the BIOS 141 is updated. In one embodiment, the system BIOS 141 includes initial instructions for starting the computer system 120.

Method of Operation

Figure 2:
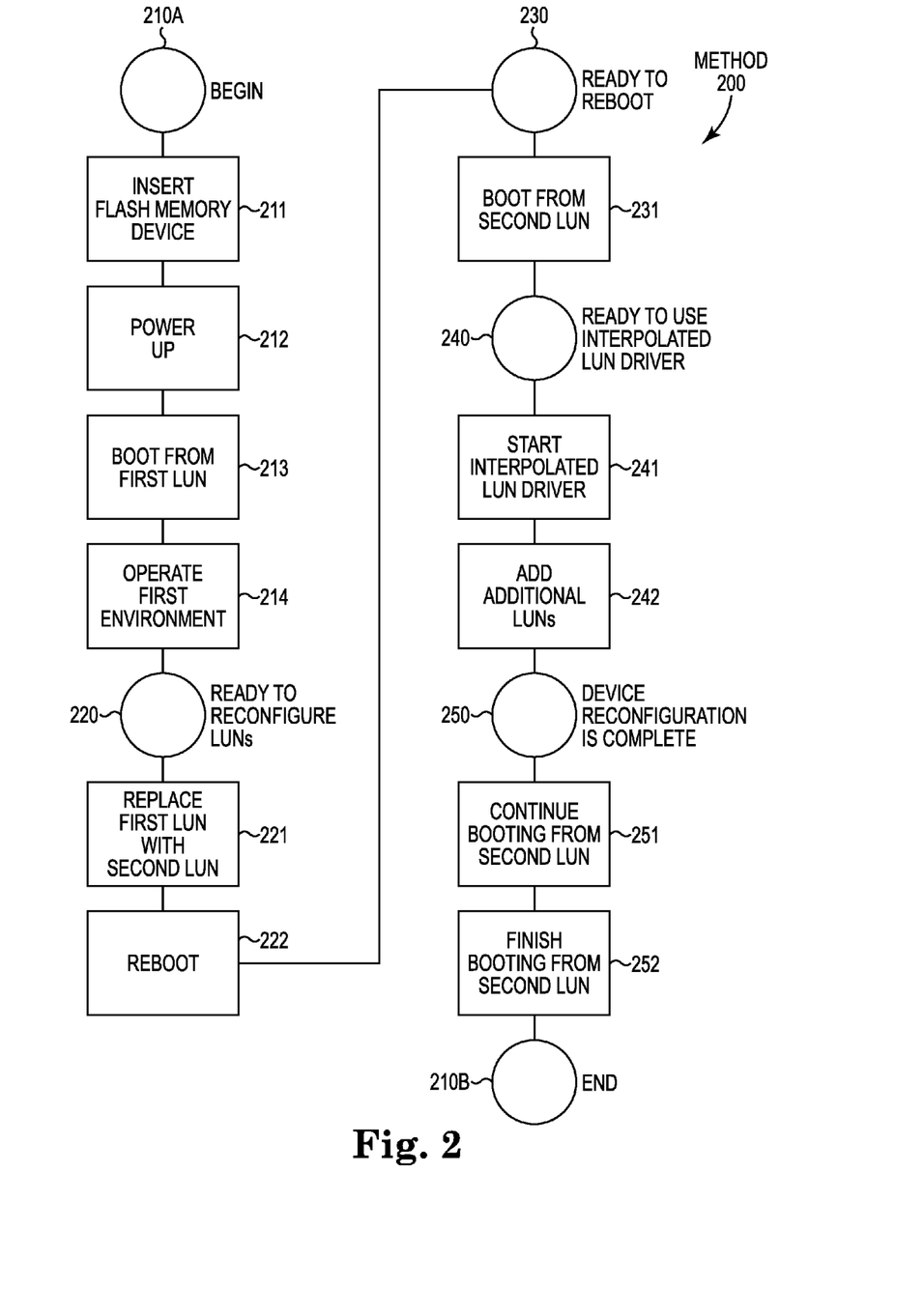
FIG. 2 shows a conceptual drawing of a method of operation.

FIG. 2 shows a conceptual drawing of a method of operation.

A method 200 includes a set of flow labels and method steps, as further described herein. Although this application describes one or more flow labels and method steps in sequence, in the context of the invention, there is no particular requirement for any such limitation. For example, the method 200 could be performed in parallel, in a pipelined manner, by more than one computing device or other electronic hardware, by more than one process or thread in the one or more computing devices or other electronic hardware, by one or more special purpose electronic devices, or otherwise.

Initial Logical Disk.

A flow label 210A indicates a beginning of the method 200. In one embodiment, the flash memory device 110 is ready to be coupled to the computer system 120.

At a step 211, the flash memory device 110 has its USB plug 113 inserted into a corresponding USB port 121 of the computer system 120.

At a step 212, the flash memory device 110 begins to receive power from the computer system 120. As part of this step, the flash memory device 110 powers up and starts operation.

At a step 213, the computer system 120, boots from a first logical disk on the flash memory device 110, as indicated by the first LUN 131-1. As only one LUN is visible to the computer system 120, this has the effect that the computer system cannot substantially select any logical disk other than the one indicated by the first LUN 131-1, even if there are multiple logical disks actually available on the flash memory device 110.

In one embodiment, the first LUN 131-1 indicates a first operating environment on a first logical disk on the flash memory device 110. For example, in one embodiment, and as described in the Incorporated Disclosures, the computer system 120 is configured using a "Windows to Go"™ environment described above, and is generally initially configured to only recognize a single LUN on the flash memory device 110. While this application describes, among others, systems in which the first LUN 131-1 indicates a first operating environment that includes a preboot environment on the flash memory device 110, in the context of the invention, there is no particular requirement for any such limitation. For example, the computer system 120 can be configured with the first LUN 131-1 another type of logical unit (such an environment other than a preboot environment).

In one embodiment, the first logical disk, as indicated by the first LUN 131-1, includes one or more read-only portions of the flash memory device 110. This has the effect that the first logical disk can be accessed by the computer system 120, and instructions stored therein can be executed by the computer system 120, without the risk of the computer system 120 making changes to that logical disk.

At a step 214, the computer system 120, as directed by instructions on the first logical disk (as referenced by the first LUN 131-1), performs instructions with respect to the first operating environment. In one embodiment, and as described in the Incorporated Disclosures, the first operating environment can include a preboot environment on a read-only logical disk. However, in the context of the invention, there is no particular requirement for any such limitation. For example, these instructions can include any set of instructions designed by the first LUN 131-1, and the logical disk including that set of instructions might be either read-only or otherwise.

Ready to Reconfigure LUNs.

A flow label 220 indicates that the flash memory device 110 is ready to reconfigure its LUNs, with the effect that, when the computer system 120 boots from the flash memory device 110, it can boot from a new operating environment.

At a step 221, the processor 112 at the flash memory device 110, as directed by the instructions in the control section 115 of the flash memory device 110, removes the first LUN 131-1 as the only available (default) LUN, and makes the second LUN 131-2 available as the only available (default) LUN. For example, the LUNs can be maintained in a list and state table, in which case the processor 112 exchanges the values for the first LUN 131-1 and the second LUN 131-2. Other techniques for maintaining information about the set of LUNs are also within the scope and spirit of the invention. This has the effect that upon reboot, the computer system 120 will only be able to access the second LUN 131-2, and the second LUN 131-2 will be the default LUN, and the computer system 120 will no longer be able to access the first LUN 131-1.

At a step 222, the computer system 120 reboots itself, as directed by the first operating environment on the flash memory device 110. This has the effect that the computer system 120 restarts, similarly to a power-off and power-on cycle, but without the need for actually power-off and power-on operations.

Ready to Boot from New LUN.

A flow label 230 indicates that the computer system 120 is ready to boot from the second LUN 131-2, with the effect of booting from its second operating environment.

At a step 231, the computer system 120, as directed by the first operating environment on the flash memory device 110, boots itself from the flash memory device 110. As described herein, when the computer system 120 boots itself from the flash memory device 110, the flash memory device 110 has only one (default) LUN available to the computer system 120, and this only one (default) LUN is, at this time in the method 200, the second LUN 131-2. As described herein, the second LUN 131-2 indicates a second operating environment on the flash memory device 110, distinct from the first operating environment on the flash memory device 110.

In one embodiment, and as described in the Incorporated Disclosures, the second LUN 131-2 indicates a regular operating system environment. For example, in one embodiment, the regular operating system environment can include a "Windows"™ environment. A "Windows"™ environment might be available if the computer system 120 is intended to boot using Microsoft Corporation's "Windows to Go"™ technology, which is intended to enable a user to install "Windows 8"™ on a USB device and boot from any computer that meets the hardware requirements for "Windows 8"™. While this application can describe systems in which the second LUN 131-2 can indicate a regular operating system environment on the flash memory device 110, in the context of the invention, there is no particular requirement for any such limitation. For example, the computer system 120 can be configured with the second LUN 131-2 indicating another type of program (such an environment other than a regular operating environment).

Ready to Use Interpolated LUN Driver.

A flow label 240 indicates that the computer system 120 is ready to execute instructions including the interpolated LUN driver 144.

At a step 241, the computer system 120, as directed by the second operating environment (as designated by the second LUN 131-2), executes instructions for booting the second operating environment. In one embodiment, the second operating environment includes a boot sequence that includes loading the interpolated LUN driver 144. In one embodiment, the boot sequence that includes loading the interpolated LUN driver 144 can be executed before other driver programs otherwise included in the regular operating environment.

At a step 242, the computer system 120, as directed by instructions including the interpolated LUN driver 144, exposes one or more additional LUNs before other driver programs in the regular operating environment are started. When the instructions including the interpolated LUN driver 144 are completed, the computer system 120 continues with further instructions included in the regular operating environment.

As part of this step, as described herein, the interpolated LUN driver 144 is configured or otherwise designated as a device driver that is loaded relatively early in the operating environment's booting process. Because the interpolated LUN driver 144 is loaded relatively early during boot-up of the operating system, it is able to perform its operations before other device drivers that are loaded as part of booting the operating system. This has the effect that the interpolated LUN driver 144 can be assured that its effects will take place before any other device drivers become operational on the computer system 120.

As part of this step, the interpolated LUN driver 144 alters the secure portion 114 of the memory 111 at the flash memory device 110. For example, the interpolated LUN driver 144 can write to the list and state table of LUNs, such as by altering the state of one or more LUNs to be "available" instead of "hidden". This has the effect that the interpolated LUN driver 144 exposes one or more additional LUNs associated with the flash memory device 110. Other techniques for exposing the one or more LUNs are within the scope and spirit of the invention.

After the interpolated LUN driver 144 alters the secure portion 114 of the memory 111 to expose one or more additional LUNs, other device drivers or other programs, which have been assigned a relatively lower priority than the interpolated LUN driver 144 and which are participating in booting the second operating environment, can proceed to be loaded when the second operating environment continues booting.

In one embodiment, the additional logical disks 131 can include reserved operating system or application storage, user storage, temporary storage, or other logical memory elements, as described herein. This has the effect that the additional LUNs can be used by the regular operating environment, or by one or more users of the computer system 120, when storing information or maintaining temporary information. For example, the additional LUNs can be used by one or more users as additional file system storage, can be used by application programs invoked by those users as temporary storage, can be used by operating environments 143 as temporary storage (such as for example paging files, virtual memory, directory structures, or other temporary storage and files), and otherwise.

Device Reconfiguration is Complete.

A flow label 250 indicates that device configuration is complete for the flash memory device 110, and the computer system 120 is ready to continue to execute instructions including the second operating environment.

At a step 251, the computer system 120, as directed by instructions including the new operating environment, continues to boot from the new operating environment and continues to prepare to execute instructions in the new operating environment, including such application programs as directed by the new operating environment. For example, the new operating environment can include a Windows™ operating system and application programs suited for operation with a Windows™ operating system.

As part of this step, the computer system 120 queries the flash memory device to determine its available LUNs. As, by this time, the interpolated LUN driver 144 has already exposed one or more additional LUNs, the computer system 120 identifies multiple LUNs as being available at the flash memory device 110. The computer system 120 continues to boot from the new operating environment, having configured the flash memory device 110 as having multiple LUNs.

At a step 252, the computer system 120, as directed by instructions including the regular operating environment, finishes booting from the new operating environment. The computer system 120 then begins to execute instructions in the new operating environment, such as operating system software and application programs. For example, in one embodiment, the computer system 120 is configured using a "Windows to Go"™ environment described above, in which the operating system software 143 includes a Windows™ operating system and application programs suited for operation with a Windows™ operating system, associated with temporary storage available on the flash memory device 110. This has the effect that the user can make use of the Windows™ operating system and application programs suited for operation therewith, without relying on software directly installed on the computer system 120.

In one embodiment, this also has the effect that the user can make use of a "Windows to Go"™ environment described above, without being limited by the restriction that the "Windows to Go"™ environment might impose of only permitting a single logical unit number. This has the effect that, upon reconfiguration, the regular operating environment can include multiple logical unit numbers or logical disks, notwithstanding that the "Windows to Go"™ environment might be initially configured to only include a single logical unit number.

End of Method.

At a step 210B, the method 200 is complete. The computer system 120 continues to perform operations within the regular operating environment, which can include a portable operating environment embodied on the flash memory device 110. The method 200 can be restarted when the computer system 120 is reset or restarted, or when the user logs out, or otherwise.

Alternative Embodiments

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A method including:
    booting a computer system from a first logical disk on a flash memory device having a processor and multiple logical unit numbers indicating multiple logical disks, said first logical disk being specified by a first logical unit number, wherein said processor reports a single logical unit number to said computer system and said computer system is initially configured to recognize only a single logical disk such that only said single logical unit number is visible to said computer system, said first logical disk including first software instructions for a preboot environment;
    said first software instructions configuring said processor to replace said first logical unit number with a second logical unit number of the multiple logical unit numbers, said processor exchanging values for said first logical unit number and said second logical unit number as directed by instructions in said flash memory device, said second logical unit number indicating a second logical disk of the multiple logical disks on the flash memory device;
    said first software instructions directing said computer system to reboot, wherein only said second logical unit number is visible and said computer system reboots from said second logical disk indicated by said second logical unit number, said second logical disk including second software instructions for an operating environment; and
    said second software instructions configuring said computer system to add one or more additional logical unit numbers of the multiple logical numbers, the additional logical unit numbers indicating additional logical disks available on the flash memory device;
    wherein said operating environment incorporates an interpolated device driver that configures said processor to expose said additional logical unit numbers before other device drivers are loaded by said computer system, wherein the computer system re-queries the flash memory device with respect to how many logical unit numbers are available and the flash memory device responds that more than one logical unit number is available.

2. The method of claim 1, including configuring the flash memory device to include said second logical disk with a portable operating environment for execution on the computer system.

3. The method of claim 1, said preboot environment including instructions that perform security checks and anti-malware operations.

4. The method of claim 1, wherein said first logical disk is read-only and said second logical disk is writable.

5. The method of claim 1, wherein said computer system is initially configured to recognize only said single logical disk in an environment that only supports such memory devices with a single logical unit number indicating said single logical disk.

6. A flash memory device including a processor and a non-transitory machine-readable medium having stored thereon instructions executable on said processor to perform a method including:
    booting a computer system from a first logical disk, said first logical disk being specified by a first logical unit number, wherein said flash memory device reports a single logical unit number to said computer system and said computer system is initially configured to recognize only a single logical disk such that only said single logical unit number is visible to said computer system, said first logical disk including first software instructions for a preboot environment;
    configuring said processor on said flash memory device to replace said first logical unit number with a second logical unit number, said processor exchanging values for said first logical unit number and said second logical unit number as directed by the instructions in said flash memory device;
    rebooting said computer system from said second logical unit number, wherein only said second logical unit number is visible and said computer system reboots from said second logical disk indicated by said second logical unit number; and by second software instructions on a second logical disk specified by said second logical unit number, exposing one or more additional logical unit numbers; and
    executing a portable operating environment in said second software instructions, said portable operating environment including said one or more additional logical unit numbers indicating one or more additional logical disks available on the flash memory device;
    wherein said computer system is only able to initially boot from said flash memory device if said flash memory device reports only said single logical unit number to said computer system and said portable operating environment incorporates an interpolated device driver that configures said processor to expose said additional logical unit numbers before other device drivers are loaded.

7. The flash memory device of claim 6, including a set of said first and second logical numbers indicating said first logical disk and said second logical disk in a secure portion of memory.

8. The flash memory device of claim 6, wherein exposing said one or more additional logical unit numbers includes:
    altering a data structure on said flash memory device by a first device driver designated to be loaded in said rebooting, said data structure including said one or more additional logical unit numbers;
    whereby when a second device driver designated to be loaded later than said first device driver is loaded, said rebooting operation queries said flash memory device and said flash memory device responds that said one or more additional logical unit numbers are available.

9. The flash memory device of claim 6, said preboot environment including instructions that perform security checks and anti-malware operations to assure security of the preboot environment and the portable operating environment.

10. The flash memory device of claim 6, wherein said first logical disk is read-only and said second logical disk is writable and includes instructions for a the portable operating environment.

11. The flash memory device of claim 10, wherein said computer system is initially configured to recognize only the single logical disk on any such flash memory device coupled to said computer system and to require that each such flash memory device has only one logical unit referring to said single logical disk.

12. A method, including:
booting a computer system from a first logical disk on a USB device having a processor and multiple logical disks available, said first logical disk including instructions: to configure said computer system to remove access to said first logical disk, to configure said processor to replace said first logical disk to add access to a second logical disk of said multiple logical disks on said USB device, said processor exchanging logical unit values for said first logical disk and said second logical disk as directed by instructions in said USB device, and to configure said computer system to reboot from said second logical disk;
wherein said computer system is initially configured to recognize only a single logical disk and is only able to initially boot from said USB device if said USB device reports only a single logical unit number indicating said single logical disk to said computer system and only said single logical unit number is visible to said computer system;
rebooting said computer system from said second logical disk wherein only said second logical disk is visible, said second logical disk including instructions for an interpolated device driver to configure said processor to expose one or more additional logical disks of the multiple logical disks available on the USB device before starting a portable operating environment embodied on the USB device; and
starting said portable operating environment embodied on said USB device, wherein a user of the portable operating environment maintains settings for personalized use on the computer system.

13. The method of claim 12, including configuring the USB device to include said second logical disk with a portable operating environment for execution on the computer system.

14. The method of claim 13, wherein said first logical disk includes a read-only preboot environment including instructions that perform security checks to assure security of said portable operating environment.

15. The method of claim 13, wherein said first logical disk is read-only and said second logical disk is writable under said portable operating environment including said additional logical unit numbers which indicate said additional logical disks for reserved operating system or application storage.

16. The method of claim 13, wherein said computer system is initially configured to recognize only a single logical disk indicated by said single logical unit number.

17. The method of claim 12, said interpolated driver being executed by said computer system before said computer system determines a number of available logical disks on said USB device, said interpolated driver exposing said one or more additional logical unit numbers before said computer system moves on to other device drivers, wherein after said computer system finishes loading said interpolated driver said USB device reports more than one available logical unit number to said computer system.

18. The method of claim 17, wherein said interpolated driver is executed before said portable operating environment, whereby said portable operating environment has access upon initialization to said one or more additional logical disks.

19. The flash memory device of claim 6, further comprising a state table of logical unit numbers to originally indicate that said first logical unit number is a default logical number pointing to said preboot environment and said second logical unit number is hidden.

20. The flash memory device of claim 19, wherein said state table is altered when said preboot environment has completed to indicate that said second logical unit number is the default logical unit pointing to said operating environment and said first logical unit number is hidden.

* * * * *